United States Patent [19]

Kouchi et al.

[11] Patent Number: 4,511,826
[45] Date of Patent: Apr. 16, 1985

[54] CONTROL APPARATUS FOR METAL SAW CUTTER

[75] Inventors: Takashi Kouchi, Nara; Eiki Tamaoki, Higashiosaka, both of Japan

[73] Assignee: Rex Industries Co., Ltd., Osaka, Japan

[21] Appl. No.: 561,089

[22] Filed: Dec. 13, 1983

[30] Foreign Application Priority Data

Dec. 18, 1982 [JP] Japan ................. 57-221122

[51] Int. Cl.³ .............................................. H02P 5/46
[52] U.S. Cl. ....................................... 318/98; 318/77; 82/46; 82/101; 10/90
[58] Field of Search ............. 82/28 R, 29 R, 46, 86, 82/101; 318/50, 77, 98; 10/89 R, 89 H, 89 F, 89 P, 89 WH, 90

[56] References Cited

U.S. PATENT DOCUMENTS

| | | | |
|---|---|---|---|
| 2,772,733 | 12/1956 | Tornberg | 82/86 |
| 3,151,283 | 9/1964 | Armstrong et al. | 318/77 X |
| 3,195,029 | 7/1965 | Gilbreath | 318/246 |
| 3,428,881 | 2/1969 | Cote | 318/345 C X |
| 3,447,055 | 5/1969 | Mason | 318/345 B X |
| 3,849,710 | 11/1974 | Mason | 318/331 |
| 3,882,745 | 5/1975 | Garrett et al. | 83/72 X |
| 3,899,945 | 8/1975 | Garrett et al. | 83/72 X |
| 3,956,680 | 5/1976 | Maecker | 318/578 |
| 3,988,578 | 10/1976 | Weber | 318/39 X |
| 4,031,437 | 6/1977 | Dempsey et al. | 318/39 |
| 4,148,346 | 4/1979 | Scarnecchia | 144/1 R X |
| 4,224,848 | 9/1980 | Beerenwinkel | 83/76 |
| 4,274,037 | 6/1981 | Soeda | 318/266 X |

FOREIGN PATENT DOCUMENTS

| | | | |
|---|---|---|---|
| 0860939 | 9/1981 | U.S.S.R. | 82/48 |
| 0963806 | 10/1982 | U.S.S.R. | 82/48 |

Primary Examiner—S. J. Witkowski
Assistant Examiner—Bentsu Ro
Attorney, Agent, or Firm—Merchant, Gould, Smith, Edell, Welter & Schmidt

[57] ABSTRACT

A metal saw cutter has a first motor for rotating a workpiece to be cut and a second motor for rotating a metal saw independently of the first motor.

A control apparatus of the metal saw cutter has a detector for detecting variations in an electrical output depending on the variation of the cutting resistance acting on the metal saw during cutting, and a controller for controlling the speed of the second drive in accordance with the detection signal from the detector.

3 Claims, 8 Drawing Figures

CONTROL APPARATUS FOR METAL SAW CUTTER

BACKGROUND OF THE INVENTION

1. Field of the Invention

This invention relates to a metal saw cutter for pipes, rods, bars, or the like, and, in particular to a control apparatus for the metal saw cutter.

This invention particularly relates to a metal saw cutter for cutting or grooving a workpiece, such as a pipe or the like, while rotating the workpiece during cutting by a metal saw.

2. Description of the Prior Art

In gas supply piping or water supply piping, steel pipes coated with a plastic layer, such as polyethylene, on the inner surface and/or the outer surface of the pipe for protection against erosion, and the like, are used.

Usually, a roller cutter is used to cut such a plastic-coated pipe. However, a roller cutter causes the production of burrs or flapping of the plastic layer at the cutting surface of the workpiece, with the result that it fails to produce a clean cutting surface. Conversely, a metal saw is known to be free from the production of such burrs or flapping of the plastic layer.

The present invention, therefore, provides a cutter using a metal saw which can provide a good cutting surface. Usually, in cutting with a metal saw, the workpiece is fixed and does not rotate, i.e., only the metal saw rotates. In other words, a metal saw cutter in which both the metal saw and the workpiece rotate did not exist before the present invention. Therefore, in the prior art, when the fixed workpiece, e.g., a pipe, has a large diameter, a large diameter metal saw must be used. This results in the necessity to use a large size metal saw cutter, and also results in a large consumption of electric power for driving the metal saw.

SUMMARY OF THE INVENTION

The primary object of the present invention is to provide an apparatus for controlling the drive of the metal saw cutter with a simple structure in which both the metal saw and the workpiece are rotated during cutting.

According to one aspect of the present invention, there is provided an apparatus for controlling a metal saw cutter having a first drive for rotating a workpiece to be cut, and a second drive for rotating a metal saw independently of the first drive.

The apparatus has a means for detecting variations in an electrical output, depending on the variation of the cutting resistance acting on the metal saw during cutting, and a means for controlling the speed of the second drive in accordance with the detection signal from the detecting means.

BRIEF DESCRIPTION OF THE DRAWINGS

The invention will be described in detail below with reference to the accompanying drawings, in which.

DESCRIPTION OF THE PREFERRED EMBODIMENTS

Figure 1:
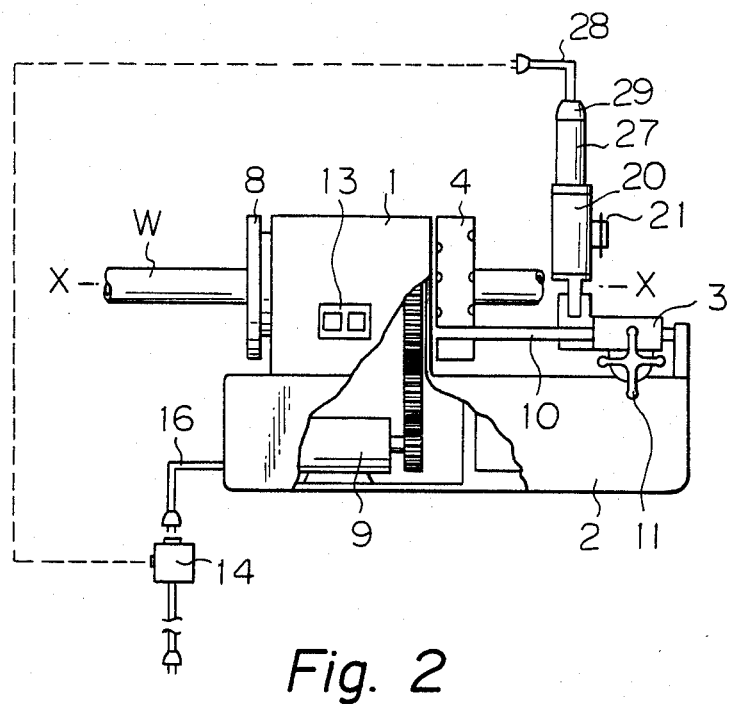
FIG. 1 is a front elevational view of a metal saw cutter according to the present invention.
Figure 2:
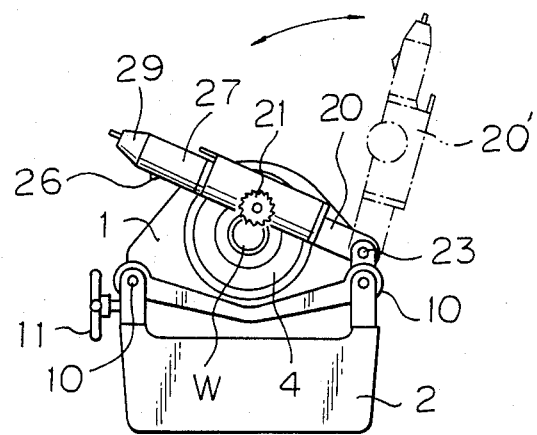
FIG. 2 is a right end view of FIG. 1.

The metal saw cutter can be incorporated in a conventional pipe threading machine, as shown in FIGS. 1 and 2, substantially without any change in design. The threading machine has a work head 1 on a base 2. The work head 1 has a front hammer chuck 4 and rear scroll chuck 8, which are mechanically connected to an A.C. spindle motor 9 provided in the base 2, so that the chucks 4 and 8 can be rotated by the spindle motor 9 (referred to as a first motor hereinafter).

A workpiece W, such as a pipe, is held by the chucks 4 and 8 so as to rotate together with the chucks about an longitudinal axis X—X of the pipe W. The numeral 13 designates a starter switch for the first motor 9.

On the base 2 are provided a pair of parallel guide bars 10, which extend parallel to the axis X—X of the pipe W.

A carriage 3 is slidably mounted to and slides along the guide bars 10. The numeral 11 designates a handle for moving the carriage 3 along the guide bars 10. The carriage 3 has a die head 5 which carries threading tools such as chasers (not shown). A reamer 7 may be also provided on the carriage 3.

Figure 3:
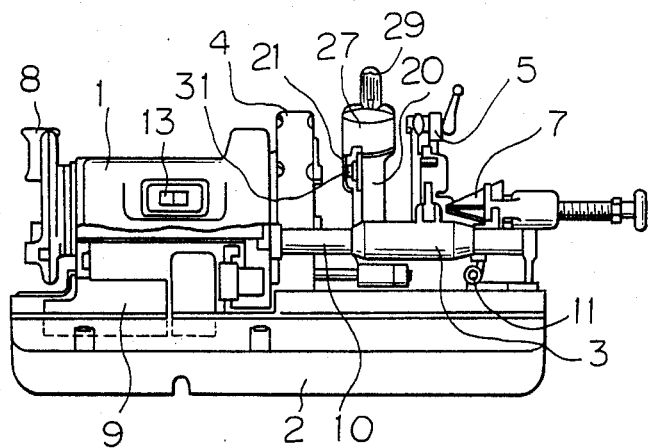
FIG. 3 is a front elevational view of an actual metal saw cutter incorporated in an existing pipe threading machine.

The reamer 7 and the die head 5 are shown only in FIG. 3, which shows an actual existing threading machine, whereas FIGS. 1 and 2 briefly and schematically show only a metal saw 21 which is attached to a threading machine, since the die head 5 and the reamer 7 have no relationship to the present invention. Therefore, FIGS. 1 and 2 are slightly different from FIGS. 3 and 4, in that FIGS. 1 and 2 are schematic views.

The present invention can be incorporated in the above-mentioned threading machine.

Figure 4:
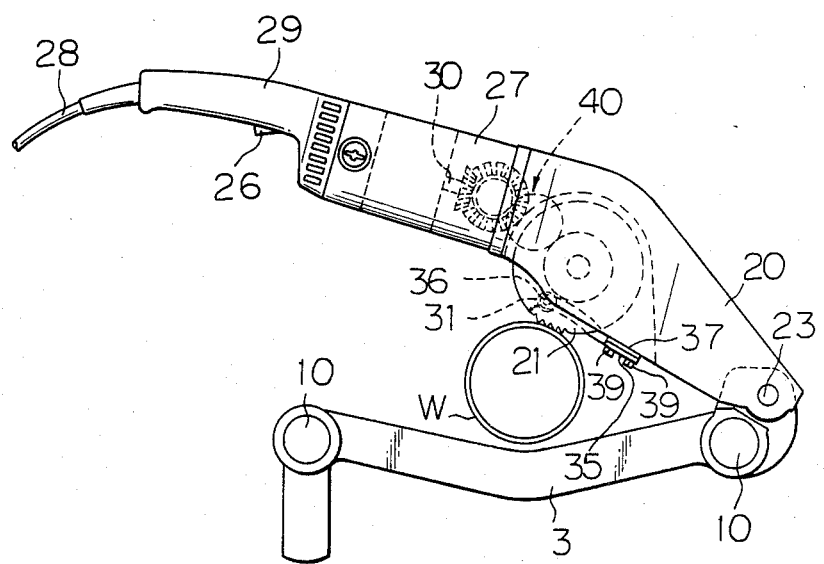
FIG. 4 is an enlarged view of a metal saw shown in FIG. 1, viewed from the same direction as FIG. 2.

As shown in FIGS. 1, 2, and 4, a swing arm 20 which has a metal saw 21 is rotatably mounted to the carriage 3 by means of a pivot pin 23, so that the swing arm 20 can rotate to a position 20', as shown by an imaginary line in FIG. 2 about the pivot pin 23. The rotation of the swing arm 20 occurs in a plane normal to the axis X—X, namely in the cutting plane of the workpiece W. The metal saw 21 is rotatably mounted on the swing arm 20 in the cutting plane, and is mechanically connected, by means of reduction gears 40 with bevel gears to a drive shaft 30 of an A.C. metal saw motor 27 (referred to as a second motor hereinafter) which is provided in the swing arm 20 so that the metal saw 21 can be rotated by the second motor 27. The second motor 27 is connected to a power supply (not shown) by means of a conductive power cord 28.

The swing arm 20 is preferably provided with a grip or handle 29 which is used for rotating the swing arm 20 about the pivot pin 23.

A roller arm 35 is detachably attached to the swing arm 20 through a spacer plate (or spacer plates) 37, by means of bolts 39.

The roller arm 35 has a stop in the form of a roller 31 which is rotatably attached to the roller arm 35 about a shaft 36. The roller 31 is positioned so that the outer diameter thereof is located inwards by a distance "t"

from the outer diameter of the metal saw 21. The distance "t" ensures that when the cutting of the pipe (workpiece) W is completed by the metal saw 21, the roller 31 comes into contact with the outer periphery of the pipe W, preventing the metal saw from further thrusting, into the pipe W in the radial direction of the pipe W. Namely, the roller 31 serves as a stop which prevents the metal saw from over-thrusting into the pipe at the end of the cutting operation. The distance "t" is adjusted in accordance with the thickness of the pipe by changing the thickness of the spacer plate 37, or the number of the spacer plates 37. This adjustment can be made by preparing in advance spacer plates 37 having different thicknesses.

The second motor 27 can be driven by a switch 26 provided on the grip 29, independently of the first motor 9.

The first motor 9 can be connected to a power supply (not shown) by means of a conductive power cord 16, through a control device 14 (FIG. 1), for controlling the speed of the first motor 9. The second motor 27 is also connected to the power supply through the control device 14.

The control of the metal saw cutter according to the present invention will be described below with reference to FIGS. 5, 6, and 7A and 7B.

First, it should be noted that the cutting resistance acting on the metal saw 21 varies in accordance with each thrust of the metal saw 21 into the workpiece W at every rotation of the workpiece, or the depth of the thrust of the metal saw 21 during cutting or grooving. Furthermore, the cutting resistance depends on the thickness of the portion of the workpiece W that has not yet been cut by the metal saw 21. This can be easily understood when the cutting resistance at the initial stage of the cutting operation is compared with that at the final stage of the cutting operation, which is clearly different from the former cutting resistance.

The rotation of the spindle, i.e., the workpiece W, should be determined in accordance with the cutting resistance, which varies moment by moment. However, in the prior art, the speed of the spindle motor 9 is not controlled in accordance with changes in the cutting resistance.

According to the present invention, the speed of the spindle motor 9 can be controlled in accordance with the cutting resistance, which varies moment by moment.

Figure 5:
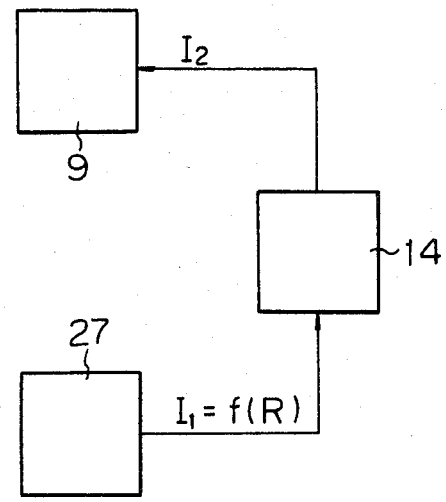
FIG. 5 is a block diagram showing the control of the metal saw cutter, according to the present invention.

The control in the present invention is basically composed of detecting the variation of the cutting resistance R acting on the metal saw 21 during cutting as a variation in the current $I_1$ of the metal saw motor 27, and controlling the current $I_2$ of the spindle motor 9, as shown in FIG. 5.

Figure 6:
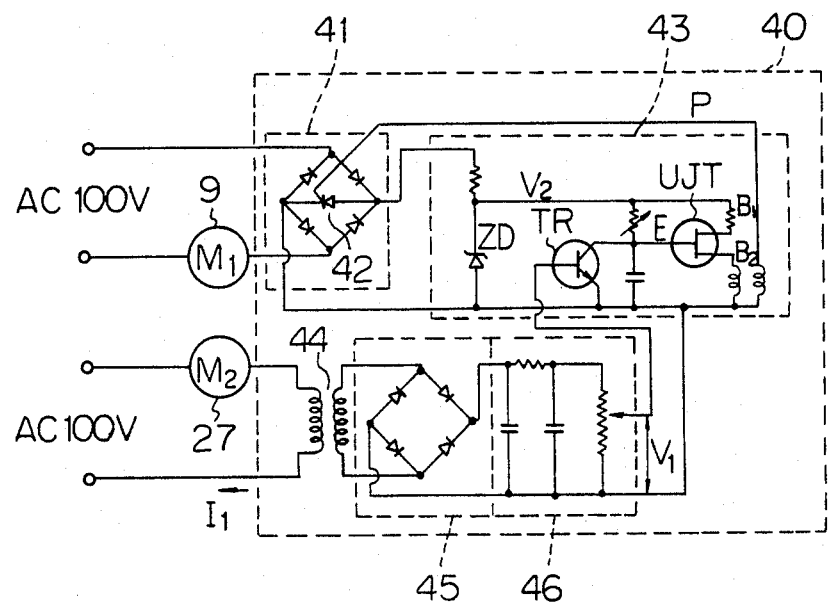
FIG. 6 is a diagram of one example of an electrical circuit for controlling the metal saw cutter according to the present invention; and, FIGS. 7A and 7B are timing diagrams of signals in the circuit shown in FIG. 6.
Figure 7A:
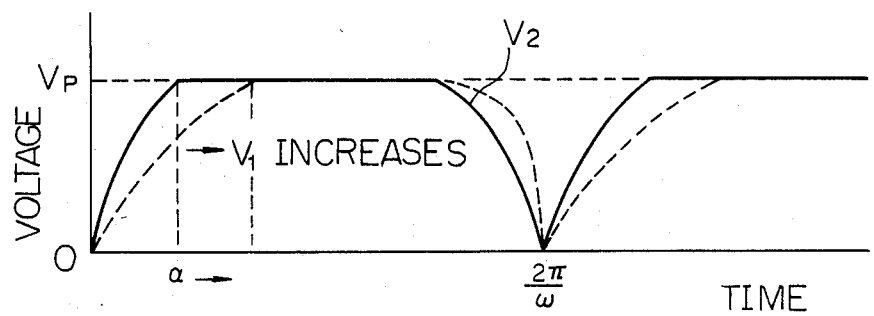
Figure 7B:
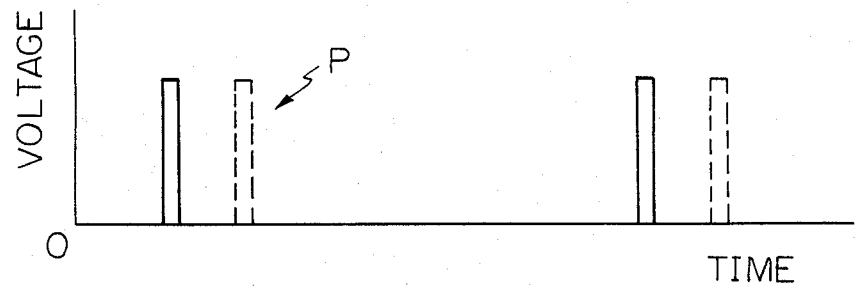

With reference to FIGS. 6, 7A, and 7B, the control circuit 40 of the control device 14 comprises a bridge circuit 41 for supplying a current to the spindle motor $M_1$ (the first motor 9), a thyristor 42 included in the bridge circuit 41 for triggering the bridge circuit 41, an adjusting circuit 43 for adjusting the ignition angle of the thyristor 42 in accordance with the D.C. voltage, a current transformer 44 for producing a current in response to the current flowing through the metal saw motor $M_2$ (second motor 27), a rectifier circuit 45, and a smoothing circuit 46. The D.C. output voltage $V_1$ of the smoothing ciruict 46 is in proportion to the current $I_1$ flowing through the motor $M_2$ and is supplied to the adjusting circuit 43.

When the current $I_1$, i.e., the voltage $V_1$, is increased, the adjusting circuit 43 increases the ignition angle of the thyristor 42 so as to decrease the current $I_2$ supplied to the motor $M_1$. As a result, the speed of the motor $M_1$ is decreased. Contrary to this, when the current $I_1$, i.e., the voltage $V_1$ is decreased, the adjusting circuit 43 decreases the ignition angle of the thyristor 42 so as to increase the current $I_2$ supplied to the motor $M_1$. As a result, the speed of the motor $M_1$ is increased.

The operation of the adjusting circuit 43 will be explained with reference to FIGS. 7A and 7B. Note that a unijunction transistor UJT has the characteristics wherein a large current flows from the emitter terminal E to the base terminal $B_2$ when the voltage at the emitter terminal E exceeds a peak voltage $V_p$, which is here the same as the zener voltage of a zener diode ZD. The voltage $V_2$ at the zener diode ZD changes as illustrated in FIG. 7A. Therefore, when the voltage $V_2$ reaches the peak voltage $V_p$, the unijunction transistor UJT generates a gate pulse P, as shown in FIG. 7B, and transmits it to the thyristor 42. As a result, the thyristor 42 is turned on. The ignition angle $\alpha$ of the thyristor 42 is dependent upon the D.C. output voltage $V_1$ of the smoothing circuit 46. That is, as the voltage $V_1$ increases, the ignition angle $\alpha$ of the thyristor 42 also increases, so that the current $I_2$ supplied to the spindle motor $M_1$ (first motor 9) is reduced.

As can be seen from the aforementioned description, according to the present invention, the speed of the spindle motor $M_1$ (first motor 9), i.e., the number of revolutions of the workpiece w, can be controlled in accordance with the cutting resistance, which varies from moment to moment during the cutting operation, so that an optimum number of revolutions is continuously maintained, regardless of the diameter or thickness of the workpiece W. Namely, according to the present invention, the relationship between the cutting resistance, i.e., the pressure of the metal saw 21 in the radial direction and the number of revolutions of the workpiece W, can be maintained at a predetermined optimum value.

In addition to the foregoing, according to the present invention, even if the cutting edge of the metal saw 21 is worn, an overload which would be otherwise applied to the cutter can be eliminated, since the cutting resistance increases and results in the reduction of the speed of the spindle motor, as mentioned before.

It will be noted that in an actual cutting operation, the metal saw motor 27 is first driven by the switch 26 so that the metal saw 21 completely thrusts into the thickness of the pipe W, and the spindle motor $M_1$ is then rotated by the switch 13 to rotate the pipe w.

We claim:

1. An apparatus for cutting plastic coated metal cylindrical members having a first drive for rotating the cylindrical member to be cut, and a second stationary drive for rotating a saw blade independently of said first drive, said drives both rotating about separate and distinct axis, means for continuously detecting the cutting resistance of said second drive in terms of its electrical output and means for controlling the speed of said first drive in response to said detecting means for adjusting said speed to maintain the cutting resistance at a predetermined optimum level throughout the cutting operation.

2. An apparatus according to claim 1 wherein said controlling means increases the current to said first drive when the electircal output of said second drive is decreased and decreases the current to said first drive when the electrical output of said second drive is increased.

3. An apparatus for controlling a metal saw cutter having a first drive for rotating a workpiece to be cut and a second drive for rotating a metal saw independently of the first drive, said apparatus comprising means for detecting variations in an electrical output depending on the variation of the cutting resistance acting on said metal saw during cuttin, and means for controlling the speed of the first drive in accordance with the detection signal from said detecting means, wherein said first drive and said second drive are A.C. motors and wherein said detecting means comprises a current transformer for producing a current in response to the current flowing through said second A.C. motor and rectifying-smoothing means for converting the output of said current transformer into D.C. voltage and wherein said controlling means comprises a bridge circuit for supplying a current to said first A.C. motor, a thyristor connected to the load side of said bridge circuit for triggering said bridge circuit, and an adjusting circuit for adjusting the ignition angle of said thyristor in accordance with said D.C. voltage.

* * * * *